April 25, 1939.  A. L. KRAUSE  2,155,864
MILLING MACHINE
Filed Aug. 18, 1937  3 Sheets-Sheet 1
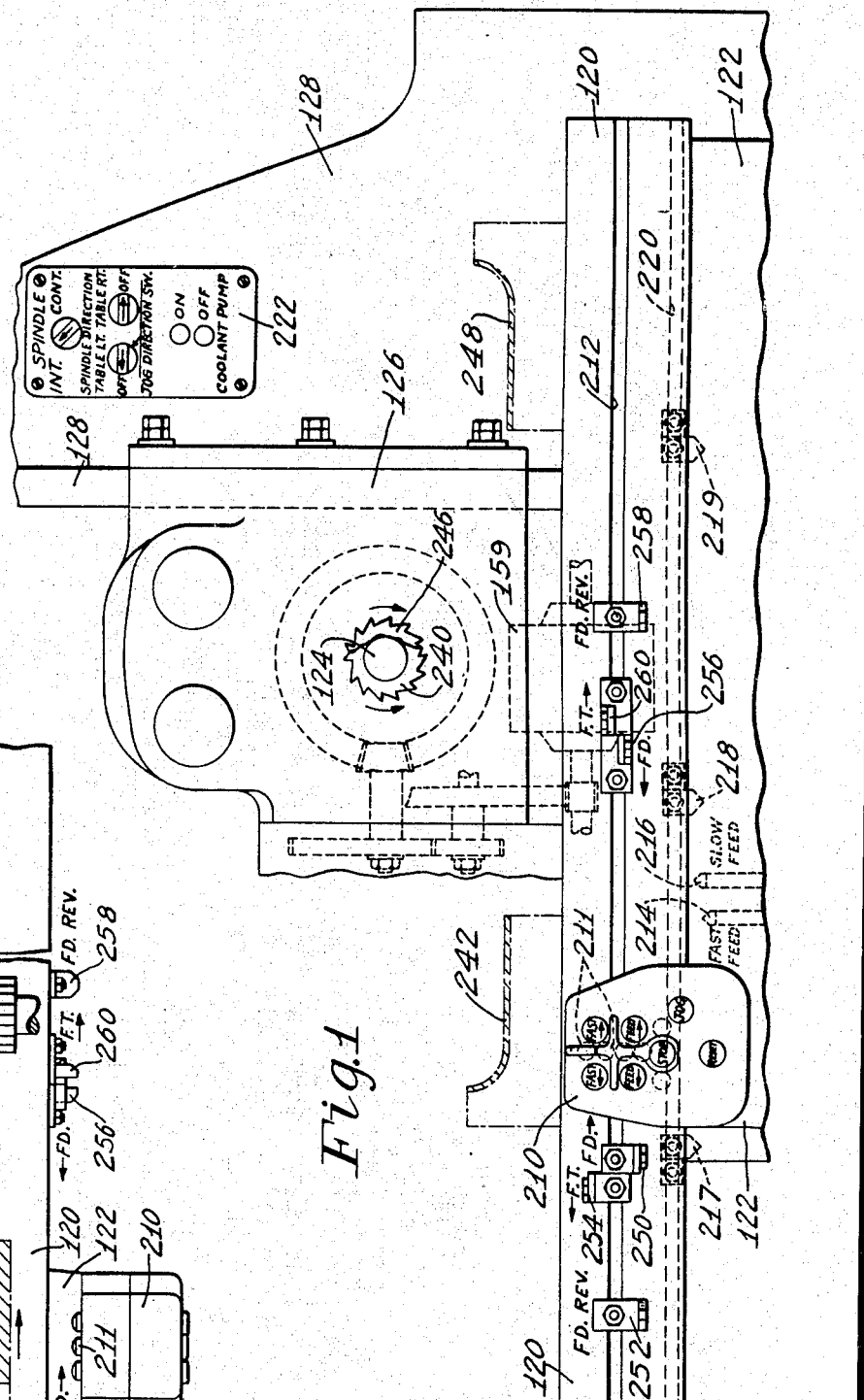
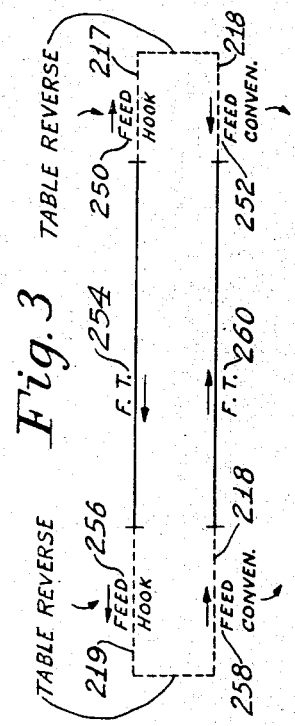
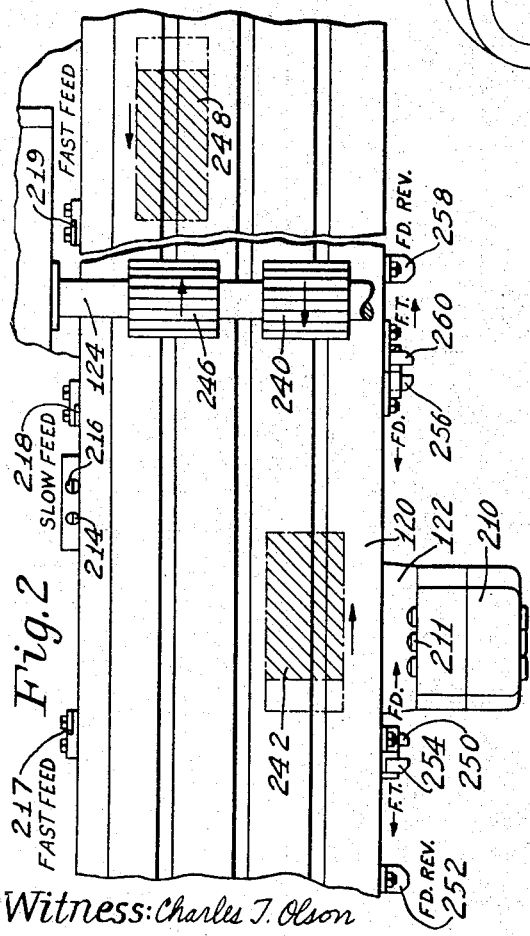
Witness: Charles T. Olson
Inventor
August L. Krause
by Fish Hildreth
Cary & Jenney attys April 25, 1939. A. L. KRAUSE 2,155,864
MILLING MACHINE
Filed Aug. 18, 1937   3 Sheets-Sheet 2
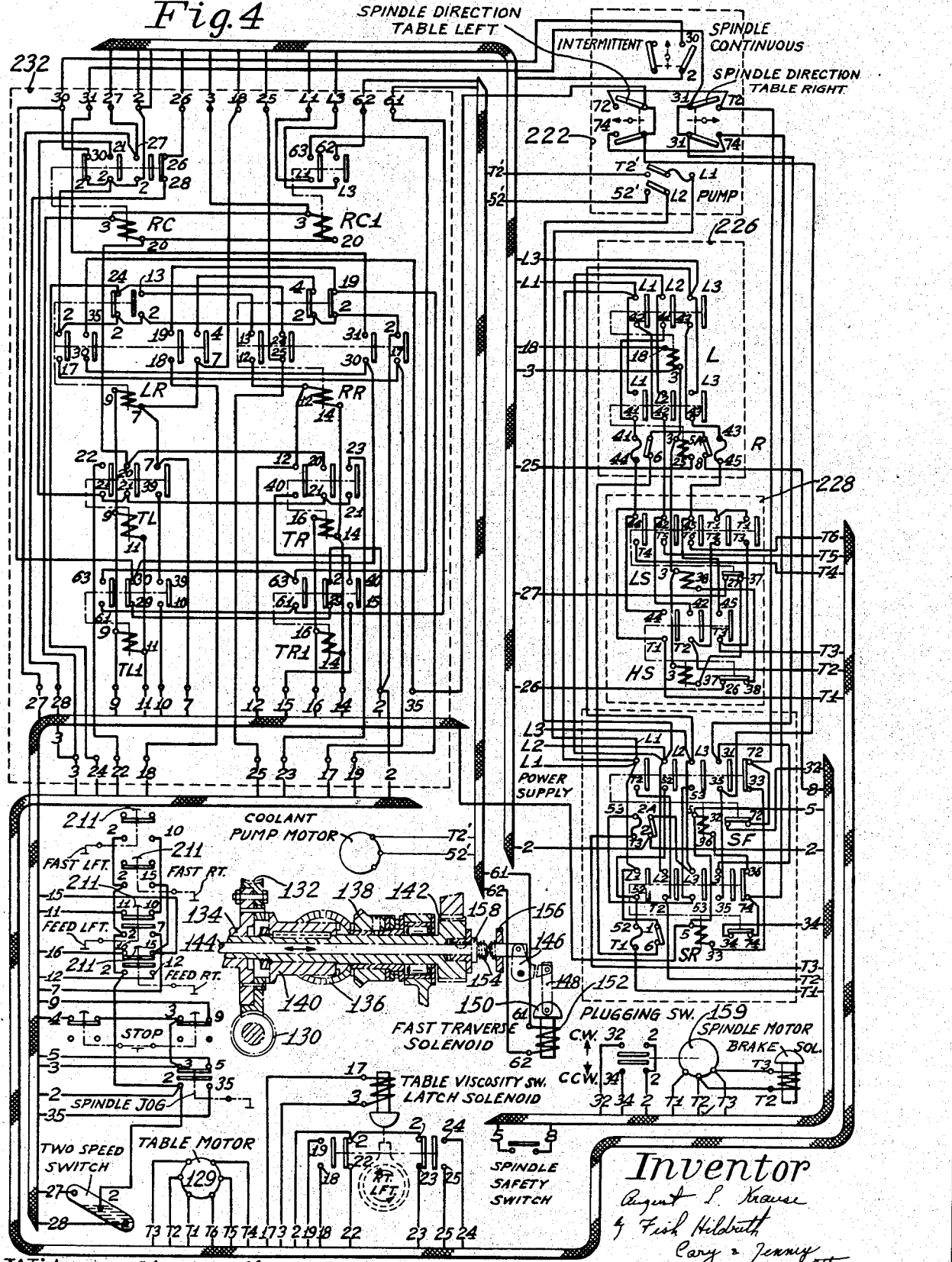

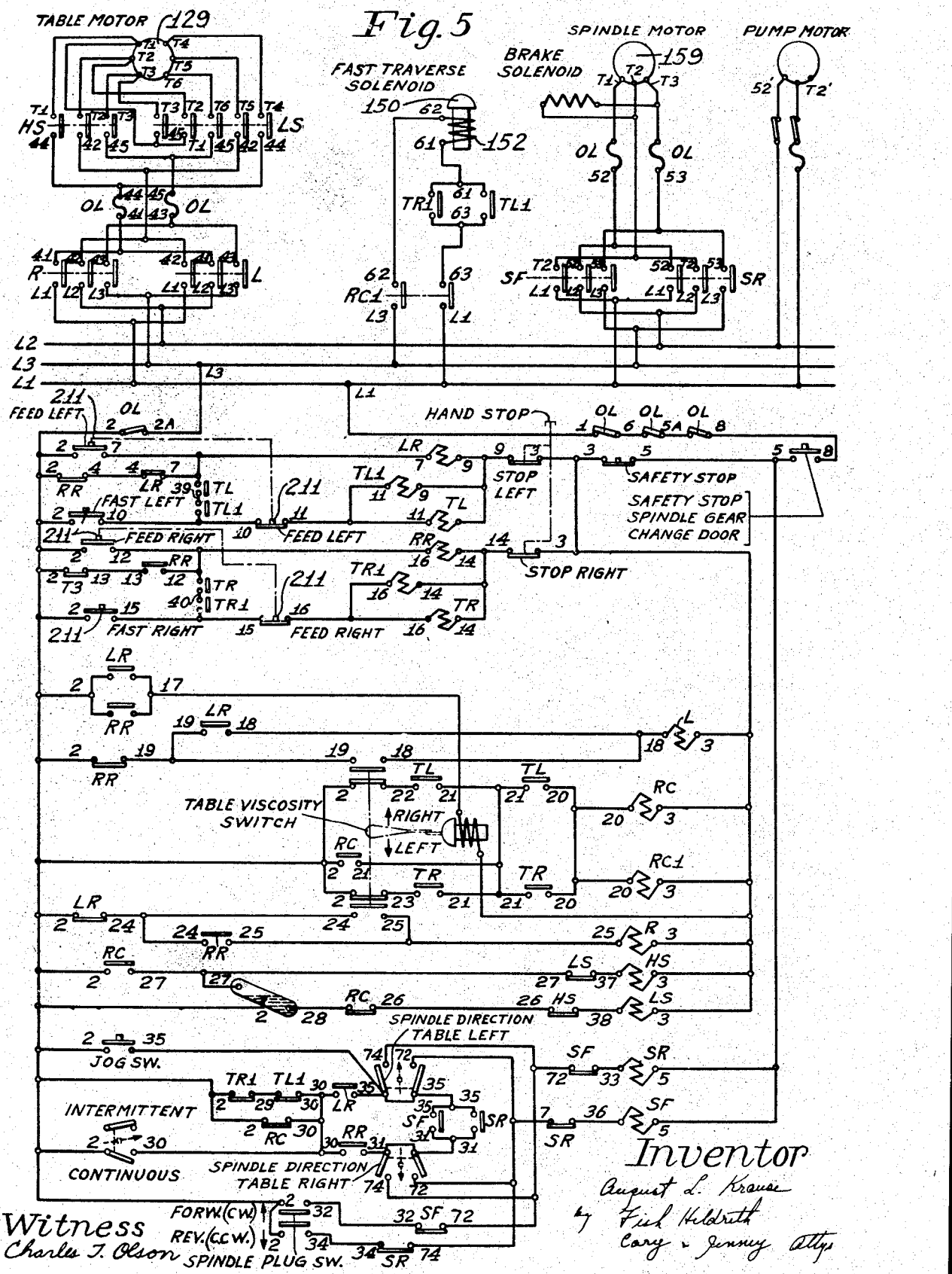

Patented Apr. 25, 1939

2,155,864

UNITED STATES PATENT OFFICE 2,155,864

MILLING MACHINE

August L. Krause, Providence, R. I., assignor to Brown and Sharpe Manufacturing Company, a corporation of Rhode Island Application August 18, 1937, Serial No. 159,699

14 Claims. (Cl. 90—21)

The present invention relates to improvements in milling machines, and more particularly to improvements in automatic control means for effecting relative translatory movements between a milling cutter spindle and a work support and for driving the spindle.

It is a principal object of the present invention to provide in a machine of this description, driving and control means for the cutter spindle which is arranged to operate in conjunction with the table movement to yield a number of new and useful operating cycles of the machine, in which oppositely faced cutters mounted on the spindle may be rendered operative selectively by a reversal of the spindle drive during the continued travel of the table in one direction to perform alternate conventional and hook milling operations upon work pieces spaced along the length of the table.

It is more specifically an object of the invention to provide means well adapted for controlling the operation of the work supporting table and associated cutter spindle when fitted with oppositely faced milling cutters to cause successive hook milling and conventional milling cuts to be taken alternately by one or the other of said milling cutters on work pieces supported toward opposite ends of the table in accordance with an automatic cycle which calls for the reversal of the cutter spindle during relative movement of the cutter spindle from one work piece to the other whereby finish cuts of the same type will be effected on each work piece to produce work of identical quality and finish.

It is a further object of the invention to provide an electrical control system which is well adapted to yield a number of new and useful operating cycles for the most efficient use of oppositely faced milling cutters in the performance of milling operations on the machine.

With these and other objects in view, as may hereinafter appear, the several features of the invention consist in the devices, combinations and arrangement of parts hereinafter described and claimed, which together with the advantages to be obtained thereby, will be readily understood by one skilled in the art from the following description taken in connection with the accompanying drawings, in which Fig. 1 is a view in front elevation of a milling machine, only so much of the machine being shown as is believed necessary to illustrate the connection of the present invention therewith; Fig. 2 is a detail plan view of the work table and cutter spindle, illustrating particularly the disposition of the oppositely faced cutters and work pieces to be engaged thereby; Fig. 3 is a diagram disclosing one operating cycle of which applicant's improved machine is capable; Fig. 4 is an electrical diagram of the machine; and Fig. 5 is an explanatory diagram illustrating in a simplified form the operating connections shown in Fig. 4.

The machine disclosed in the drawings as embodying in a preferred form the several features of the present invention, is of the general type disclosed in the patent to Bennett and Krause, No. 2,068,840, dated January 26, 1937, and comprises a work table 120 supported for transverse movements on ways formed on a base 122, and a milling cutter spindle 124 rotatably mounted on a carriage or spindle head 126 which is supported for vertical adjustment on a machine column 128 forming an integral unit with the base 122. The work table of the machine is driven by means of a reversible two-speed electric motor 129 illustrated in Figs. 4 and 5, through mechanical driving connections including a fast-slow clutch which is shiftable to cause the table to be driven from the motor alternatively at a feed or traverse rate. These driving connections as generally shown in Fig. 4 of the drawings, comprise a slow feed gear train including the worm 130 continuously driven from the table motor through connections, not shown, and worm gear 132 loosely supported to turn on a hollow driven shaft 134, and a quick traverse gear train comprising the bevel driving gear 136 continuously driven from the table motor through connections, not shown, and gear 138 loosely sleeved on the shaft 134. There is also rigidly keyed to the shaft 134, a fast-slow clutch member 140, which is shiftable between alternative driving positions in which the clutch sleeve 140 and shaft 134 are positively driven from the feed worm gear 132, or from the fast traverse bevel gear 138. The shaft 134 is provided at its right hand end with a gear 142 which is operatively connected to drive the table. For controlling the position of the clutch, the shaft 134 has journalled therein a control shaft 144 which is connected at one end by means of a bell-crank 146 and link 148 to the armature 150 of a solenoid 152. A compression spring 154 supported between a stationary member 156 and a collar 158 on the control shaft 144, tends normally to maintain the clutch member 140 in its position to the left in engagement with the slow feed worm gear 132. The cutter spindle 124 is driven from a reversible electric motor 159 and reduction gearing carried on the head 126, as shown in dotted lines in Fig. 1 of the drawings.

Inasmuch as these connections for driving the table and spindle, have been fully described and illustrated in the patent to Bennett and Krause above referred to, and form specifically no part of the present invention, further illustration thereof is believed unnecessary.

The machine illustrated in the drawings, is provided with an electrical control system which is in many respects similar to that illustrated and described in the patent to Bennett and Krause above referred to, including feed and traverse switch control elements operable either manually or by means of table dogs to control the direction, rate of travel, and starting and stopping of the table, together with additional controls which may be actuated either manually or in combination with the table movements to control the starting and stopping and the direction of rotation of the cutter spindle.

In accordance with a principal feature of applicant's invention, switch control devices are provided which may be readily controlled to reverse the spindle rotation at an intermediate point in the travel of the table in either direction, and thereby to cause alternate conventional and hook milling operations in the same order to be performed on separate work pieces spaced along the length of the table in the path of each of said cutters.

The electrical devices employed for controlling the direction of rotation of the spindle, include spindle reversing switch connections which are energized at each reversal in the direction of table travel, and an interlock associated therewith operative to effect said reversal of the spindle subsequent to the table reversal, and only after a second pass of the operating cutter over the work piece supported in operating position with relation thereto.

In the specific embodiment of the invention shown, the interlock referred to, is controlled from the connections for stopping the spindle when the table is moved at a quick traverse rate, so that when the table is again slowed to a feed rate, the spindle will be started in the opposite direction for operation upon a second work piece supported in position for engagement with a second oppositely faced cutter.

As best shown in Fig. 1 of the drawings, the table operating controls include the manually operable "fast left", "fast right", "feed left", "feed right", and "stop" switch control buttons supported on the control post 210 mounted on the machine base 122 adjacent the front side of the work supporting table 120, together with corresponding dog actuated control plungers 211 for operating each of these switches mounted on the rear side of the post 210 as generally indicated in dotted lines in Fig. 1. The plungers 211 engage respectively with correspondingly designated table dogs adjustably supported in a T-shaped slot 212 formed on the front side of the table 120. For enabling the table to be driven at either of two feed rates, there are also provided at the rear side of the table, two vertically movable dog actuated plungers 214 and 216 shown in dotted lines in Fig. 1, and arranged to be operated by dogs such as that shown at 213 (Fig. 2) adjustably supported in a T-shaped slot 220 on the rear side of the table. The plungers 214 and 216 operate to control the position of the mercury switch illustrated in the electrical diagram Figs. 4 and 5. The downward movement of the plunger 214 serves to close the mercury switch contact 2—26 to drive the table at the relatively faster feed rate, whereas, the downward movement of the plunger 216 operates to close the mercury switch contact 2—27 to cause the table to be driven at the relatively slower feed rate. Inasmuch as the mechanical connections, not here shown, for controlling the operation of the mercury switch, are fully described and illustrated in the patent to Graves and Bennett, No. 2,077,408, dated April 20, 1937, for Machine tools, and form specifically no part of the present invention, no further description thereof is believed necessary.

The operation of the spindle motor 159 and cutter spindle 124 is controlled automatically during the operation of the table in accordance with the setting of a number of spindle control switches supported on a panel 222 on the machine column 128 (see Fig. 1). These controls as set forth in the captions on the panel 222, provide for alternative continuous or intermittent operation of the spindle, and further determine the direction of spindle rotation during table travel in each direction.

The construction and operation of the electrical connections for controlling the operation of the table and the cutter spindle respectively, through their driving motors, will be briefly described in connection with the electrical wiring diagram Fig. 4, and the explanatory diagram Fig. 5, so far as necessary to make clear the connection therewith of the several new and patentable features of construction and operation of the machine above set forth.

The table and cutter spindle motors are driven from a three-phase power line designated as L1, L2 and L3. The table motor is controlled by a reversing switch having two exciting relays L and R. The main switch for the table motor is supported on a panel indicated in dotted lines at 226 (see Fig. 4), and comprises two sets of contacts which are controlled by the relay coils L and R respectively, to connect the motor and table for right hand or left hand operation. The high speed and low speed switches for the table motor are mounted on a second panel indicated at 228 in dotted lines, and comprises two sets of contacts controlled respectively by the relay coils HS or LS for high speed or low speed operation of the table motor.

On another panel indicated at 230 in dotted lines, are carried the main switch contacts for the spindle motor 129 controlled by means of two relay coils SF and SR for opposite directions of rotation of the motor and spindle driven thereby. It will be noted that the several cutter spindle control switches operated by the control knobs on the panel 222, are illustrated in the electrical diagram Fig. 4, in their proper positions with relation to the panel 222 indicated in dotted lines.

On another panel indicated at 232 in dotted lines, are a number of secondary relay switches which are arranged to contol the operation of the table and spindle switches above described, together with the solenoid 150 which operates the slow feed and quick traverse clutch 138. These secondary relays comprise the secondary coils LR and RR controlled respectively by the "feed left" and "feed right" table switches, the coils TL and TR controlled respectively by the "fast left" and "fast right" table switches, the secondary relay coil RC which controls the operation of the slow feed and quick traverse clutch solenoid 150, and two additional relays TL1 and TR1 which are connected in parallel with the relays TL and TR, and have a duplicate action to control the operation of certain secondary switch connections as hereinafter more fully set forth.

In accordance with a principal feature of the present invention, interlocking switch connections are provided which are controlled by the spindle motor directional switch relays SF and SR which operate independently of a change in the direction of table travel to maintain the spindle motor in operation in the same direction until the circuit to both of these relays is broken by a shift in the rate of table travel from feed to quick traverse takes place. When the table is again slowed to the feed rate, the solenoid SF or SR is energized to drive the spindle motor in the direction which is now determined in accordance with the direction of table travel and the setting of the spindle directional switch on the panel 222 corresponding to the direction in which the table is travelling. The interlock referred to, is provided by SF contact 31—35 and SR contact 31—35.

Figs. 2 and 3 of the drawings, illustrate a set-up of applicant's machine for automatic operation, in which successive rough hook milling and finish conventional milling cuts are performed by a milling cutter 240 upon a work piece 242 mounted toward the left hand end of the work supporting table 120, and in which successive rough hook milling and finish conventional milling cuts are taken by an oppositely faced cutter 246 on a similar work piece 248 supported toward the right hand end of the table 120. Assuming that the table is started from an intermediate position, as shown in Fig. 2, the operator presses the "fast right" button, causing the table to move at a quick traverse rate to the right until as the cutter 240 approaches the work piece 242, the feed dog 250 actuates the "feed right" switch to slow the table to a feed rate, at the same time starting the cutter spindle rotating in a counter-clockwise direction to perform a hook milling operation on the work piece 242. When the table has moved to the right a sufficient distance to bring the cutter 240 against the shouldered end of the work piece 242, the reversing feed dog 252 actuates the "feed left" switch to reverse the direction of table travel. The cutter spindle 124 is continued in operation in a counter-clockwise direction, so that a finish conventional milling cut is now performed on the work piece 242. When this cut is completed, the "fast left" dog 254 contacts with the "fast left" button to move the table at a quick traverse rate to the left, at the same time causing the spindle 124 to be stopped. The table continues at a quick traverse rate until again slowed to a feed rate by engagement of the "feed left" dog 256 with the table "feed left" button. The cutter spindle is now automatically started in a clockwise direction, causing the cutter 246 to perform a rough hook milling operation upon the work piece 248. As the cutter 246 reaches the shouldered end of the work piece 248, a feed reversing dog 258 actuates the "feed right" button to reverse the direction of table travel from left to right without, however, reversing the cutter spindle which continues its operation in a clockwise direction to perform a second finish conventional milling cut on the work piece 248. At the completion of this operation upon the work piece 248, a quick traverse rate dog 260 actuates the table "fast right" switch, causing the table to move to the right at a quick traverse rate and to stop the operation of the spindle 124. With the cycle of operation above outlined, the table may be maintained continuously in operation, the operator having sufficient time during the operation on one work piece, to replace the finished work piece at the opposite end of the table with a new work piece. It will be understood that the automatic cycle above described, is only one example of an automatic cycle which may be employed to advantage with applicant's improved driving and control system for the machine, and that variations in this cycle may be readily made to accomodate different classes of work in which it is desirable to operate upon different pieces of work supported along the length of the table in operative relationship to two oppositely faced cutters mounted on the cutter spindle 124.

The operation of the electrical connections to cause the machine to operate in accordance with the automatic cycle above described, may be briefly described as follows:— When the operator presses the "fast right" button, relays TR, TRI and RR are energized and held in by holding contacts RR 13—12, TR 12—40 and TRI 40—15. The closing of contact RR 24—25 energizes contactor R which causes the table motor to start driving the table to the right. At the same time contacts TR 23—21 and TR 21—20 close, energizing contactors RC and RCI. Contact TRI 63—61 has already closed, so that the fast traverse solenoid 150 is energized to shift the feed-quick traverse clutch 140 to quick traverse position.

It is assumed that the "spindle intermittent-continuous" switch is set for intermittent operation, the "spindle direction table right" switch is set for counterclockwise operation of the spindle, and the "spindle direction table left" switch is set for clockwise spindle operation. While the table continues in fast traverse to the right, the spindle motor is prevented from starting because the contacts RC 2—30 and TRI 2—29 are held open. As the feed dog 250 now operates to close contact 2—12, contact 15—16 is opened, de-energizing TR and TRI relays, but leaving the relay RR energized. Contacts RC 2—30 and TRI 2—29 close, thus establishing a circuit through RR contact 30—31 which remains closed and the directional switch contact 31—74 to energize the spindle motor relay SR, thus starting the motor in a counterclockwise direction. When the roughing cut on the work piece 242 is completed, the table feed reverse dog 252 operates the "feed left" switch, closing contact 2—7 and opening contact 10—11 so that LR is energized. Contact 2—13 now opens, de-energizing RR.

When reversal takes place as above described, without shifting the table controls from the feed to quick traverse rate, the spindle motor relay SR remains energized through the operation of the SR interlocking contact 31—35. This operation is possible due to the overlapping action of relays LR and RR, which causes LR contact 30—35 to be closed before RR contact 30—31 is opened. Upon completion of the finishing cut, the fast traverse left dog 254 operates to close the "fast left" switch 2—10, which energizes TL and TLI, and closes the holding circuit contacts TL 7—39 and TLI 39—10. The closing of TL contacts 22—21 and 21—20 energizes RC and RCI, which in turn operates to energize the fast traverse solenoid 152 to operate the table at a quick traverse to the left. The opening of TLI contact 29—30 and RC contact 2—30, operate to deenergize the spindle motor relay SR to stop the spindle. The SR interlock 31—35 opens, so that when the spindle motor is subsequently started, the direction thereof will be controlled by the setting of the "spindle direction table left" switch.

As the table travelling at a quick traverse rate to the left, reaches a position in which the cutter 246 is brought into operative relation to the work piece 248, the "feed left" dog 256 acts upon the "feed left" switch to close the "feed left" contact 2—7 and to open contact 10—11, thus de-energizing TL and TL1. The opening of contacts TL 22—21 and 21—20 operates to de-energize the relays CR and CR1 to shift the clutch 240 to feed position. Contacts TL1 29—30 and RC 2—30 close, completing the circuit through the LR contact 30—35 and the "spindle direction table left" switch contacts 35—72, thus energizing the spindle motor relay SF and causing the spindle to start rotating in a clockwise direction. SF interlock 31—35 closes, operating as above described to maintain the spindle switch relay SF in operation when the direction of table travel is reversed, and until the spindle rotation is again stopped by the shift from feed to quick traverse rate. The operation of the electrical connections to reverse the direction of table drive from left to right, and thereafter to subsequently shift the table to quick traverse right, are identical with the same operations above described in connection with the reversal at the other end of the table, and it is believed, therefore, need not be further described.

A modification of the automatic cycle above described, may be readily obtained, in which the two milling cuts on the work pieces located at each end of the table, may be performed at different feeding rates. To this end, the table dogs 217, 218 and 219 are adjustably mounted on the back side of the table, as best shown in Figs. 1 and 2 of the drawings, for engagement with the fast feed and slow feed plungers 214 and 216, which act through a mercury switch to energize respectively the switch contactors LS or HS for effecting slow feed or fast feed operation of the table motor. These dogs, as illustrated in Figs. 1 and 2, are set to cause a rough milling cut on each work piece to be performed at a relatively slow rate, and the return finish conventional milling cut to be performed at the faster rate. As the table is started in operation to the right, the dog 218 will have engaged with the slow feed plunger 216, causing the mercury switch to be shifted to the position shown in Fig. 5, in which the mercury switch contact 2—28 is closed. The table motor at this time continues in operation at the faster rate suitable for fast traverse of the table because contact RC 2—27 remains closed. When the table is now slowed to the feed rate by the actuation of the "feed right" switch by feed dog 250, contact RC 2—27 opens, and contact RC 28—26 closes, de-energizing the coil HS and energizing LS, so that the table motor operates at the slower feed rate. At the instant of reversal of the table, dog 217 engages the fast feed plunger 214 to shift the position of the mercury switch, opening contact 2—28 and closing contact 2—27, thus de-energizing LS and energizing HS to operate the table motor at the faster feed rate. During the return movement of the table to the left at quick traverse, the table dog 218 again actuates the slow feed plunger 216 to open contact 2—27 and to close contact 2—28, so that during the subsequent hook milling cut upon the work piece 248, the table will again be driven at the slower feed rate. At the instant of reversal of the table from left to right, the dog 219 acts upon the fast feed plunger 214 to again reverse the position of the mercury switch, opening contact 2—28 and closing contact 2—27 to de-energize LS and to energize HS for the return conventional milling cut upon the work piece 248 at the slower feed rate.

It will be understood that the invention is not limited to the specific embodiment shown, and that various deviations may be made therefrom without departing from the spirit and scope of the appended claims.

What is claimed is:

1. A milling machine having, in combination, a work table, a reversible drive for the table, table actuated feed and traverse directional control elements for said drive, a rotary cutter spindle adapted for supporting oppositely faced cutters thereon, a reversible drive for the spindle, and connections controlled by said control elements effective upon a shift from traverse to feed following table reversal at a feed rate to reverse the spindle drive.

2. A milling machine having, in combination, a work table, a rotary cutter spindle adapted for supporting oppositely faced cutters thereon, a support for the spindle, means for effecting relative translatory movements to the work table and spindle support, feed and traverse directional control elements for effecting said translatory movements in accordance with an automatic cycle comprising feed and return feed movements toward each limit of translatory movement and quick traverse movements therebetween, a reversible drive for the spindle, and devices actuated by said feed and traverse directional controls for reversing the spindle drive operative to cause a rotation of the spindle in one direction during one of said feed and return movements and in the other direction during the other of said feed and return movements.

3. A milling machine having, in combination, a work table, a reversible drive for the table and control devices therefor operative to effect a feed movement at a predetermined rate and a return feed movement at a different rate toward and from each limit of table movement, means controlled from the table for reversing the spindle at an intermediate point of the table travel in each direction, and thereby to cause one of said cutters by rotating in one direction to make successive cuts on a work piece suitably supported on the table during the continued travel of the table in one direction at a first feed rate and a return movement thereof at a different feed rate, and to cause the other of said cutters while rotating in the reverse direction to make successive cuts on a second piece suitably supported on the table during continued travel of the table in the opposite direction at said first feed rate and the return movement thereof at said different feed rate.

4. A milling machine having, in combination, a work table, means for driving the table including means for reversing the direction of table drive and rate changing means operable to drive the table alternatively at feed and traverse rates, a rotary cutter spindle adapted to support oppositely faced cutters thereon, means for starting and stopping and reversing the direction of spindle rotation, and devices for controlling the operation of the table and spindle in accordance with an automatic cycle comprising feed, reverse feed and quick traverse, table actuated controls for imparting table feed and return feed movements from feed positions toward the limit of table travel in each direction, and quick traverse movements of the table between said feed positions, and means controlled by said table actuated controls for driving the spindle in one direction during one of said table feed and return feed movements and in the opposite direction during the other of said table feed and return feed movements, and for stopping the spindle rotation during movement of the table at quick traverse.

5. A milling machine having, in combination, a work table, means for driving the table including means for reversing the direction of table drive and rate changing means operable to drive the table alternatively at a feed or traverse rate, a rotary cutter spindle adapted to support oppositely faced cutters thereon, a reversible drive for the spindle, means controlled by said table drive reversing means for reversing the direction of spindle drive, an interlock operable to prevent reversal of the spindle drive, and means controlled by said rate changing means to disengage the interlock simultaneously with a shift from feed to traverse.

6. A milling machine having, in combination, a work table, a reversible table drive, a rotary cutter spindle adapted to support oppositely faced cutters thereon, a reversible drive for the table, independent control devices for determining the direction of spindle rotation during table travel in each direction, and an interlock whereby either of said control devices is effective to maintain spindle rotation in the same direction during and subsequent to reversal of the table, and means to disengage the interlock and thereby to shift the control of spindle rotation to the other of said devices.

7. A milling machine having, in combination, a work table, means for driving the table including means for reversing the direction of table drive and rate changing means operable to drive the table alternatively at a feed or traverse rate, a rotary cutter spindle adapted to support oppositely faced cutters thereon, means for starting and stopping and reversing the direction of spindle rotation, table actuated control means for determining the direction and rate of table travel, said table control means being constructed and arranged to reverse the spindle drive with each reversal in the direction of table travel, and an interlocking device operative to effect said reversal of the spindle subsequent to the table reversal and only upon a shift in the rate of table travel from traverse to feed.

8. A milling machine having, in combination, a movable work table, a rotary cutter spindle adapted to support two oppositely faced milling cutters, driving connections for the table including a reversible table motor, driving connections for the spindle including a reversible spindle motor, switch connections for reversing the table motor, switch connections for reversing the spindle motor, means controlled by reversal of the table motor for reversing said spindle motor switch connections, an interlock effective to prevent reversal of the spindle motor upon reversal of the table motor, and means for disengaging the interlock during the return movement of the table subsequent to each reversal.

9. A milling machine having, in combination, a work table, a rotary cutter spindle adapted for supporting oppositely faced cutters thereon, electrical driving and reversing means for the table including left and right directional feed and traverse switch connections, and electrical driving and reversing means for the spindle comprising spindle reversing switch connections actuated by the table directional switch connections, an interlock in said spindle reversing switch connections operative to prevent reversal of the spindle, and spindle starting and stopping switch connections actuated from said table traverse switch connections to stop the spindle and to disengage the interlock, and by said table feed switch connections to start the spindle in accordance with the setting of the spindle reversing switch connections.

10. A milling machine having, in combination, a work table, a rotary cutter spindle adapted for supporting oppositely faced cutters thereon, electrical driving and reversing means for the table including left and right directional feed and traverse switch connections, and electrical driving and reversing means for the spindle comprising independent control switches for determining the direction of spindle rotation during table travel in each direction, an interlock whereby spindle rotation in the same direction is maintained under the control of each one of said independent control switches in turn subsequent to table reversal, and means controlled by table movement to disengage the interlock.

11. A milling machine having, in combination, a work table, a rotary cutter spindle adapted for supporting oppositely faced cutters thereon, electrical driving and reversing means for the table including left and right directional feed and traverse switch connections, and electrical driving and reversing means for the spindle comprising starting and stopping switch connections controlled by the table feed switch connections to start the spindle and by said traverse switch connections to stop the spindle, spindle reversing switch connections actuated by said table directional switch connections to reverse the spindle, an interlock in said spindle reversing switch connections operative to prevent reversal of the spindle upon reversal of the table, and means effective upon stopping the spindle to disengage the interlock.

12. A milling machine having, in combination, a work table, a rotary cutter spindle adapted for supporting oppositely faced cutters thereon, electrical driving and reversing means for the table including slow and fast feed and traverse switch connections, electrical driving and reversing means for the spindle comprising selector means to control the direction of spindle rotation dependent upon the direction of table travel, an interlock associated with said selector means to maintain the continued rotation of the spindle in the same direction during and subsequent to table reversal, and means controlled from the table to effect a quick traverse movement of the table in one direction followed by feed and return feed movements at different rates, and to start the spindle rotating continuously in one direction for the performance of successive hook and conventional milling cuts by one of said cutters on a work piece suitably mounted on the table, and thereafter to stop the spindle and to effect a quick traverse movement of the table in the reverse direction followed by continued feed and return feed movements at different rates, and to start the spindle continuously rotating in the opposite direction for the performance of successive hook and conventional milling cuts in the same order by the other of said cutters on a second work piece suitably mounted on the table.

13. A milling machine having, in combination, a work table, a rotary cutter spindle adapted for supporting oppositely faced cutters thereon, a support for the spindle, means for effecting relative translatory movements to the work table and spindle support, devices controlled from the table for effecting translatory movements at variable feed and traverse rates in accordance with an automatic cycle comprising a predetermined rate of feed and a different rate of return feed movement to and from each limit of translatory movement, and quick traverse movements therebetween, a reversible drive for the spindle, and connections actuated by said table controlled devices for reversing the spindle drive operative to cause the rotation of the spindle in one direction during one of said feed and return feed movements, and in the other direction during the other of said feed and return feed movements.

14. A milling machine having, in combination, a movable work table, a rotary cutter spindle adapted to support two oppositely faced milling cutters, driving connections for the table including a variable speed motor, and including rate changing means operable to drive the table alternatively at feed and traverse rates, driving connections for the spindle including a reversible spindle motor, and devices for controlling the operation of the table and spindle in accordance with an automatic cycle comprising directional feed and quick traverse table actuated controls for imparted feed and return feed movements to the table from feed positions toward the limit of table travel in each direction, and quick traverse movement to the table between said feed positions, subsidiary switch connections controlled by said table actuated controls for driving the spindle in one direction during one of said table feed and return feed movements, and in the opposite direction during the other of said table feed and return feed movements, and for stopping the spindle rotation during movement of the spindle from quick traverse, additional dogs on the table, and secondary switch connections controlled thereby operative to effect each of said table feed movements at one feed rate of the table and each return feed movement at another feed rate of the table.

AUGUST L. KRAUSE.